Dec. 22, 1970   R. C. JEWELL   3,549,274
STIRRERS
Filed March 28, 1969

Inventor
RONALD COLGAN JEWELL

By Morrison, Kennedy & Campbell
Attorneys

United States Patent Office 3,549,274
Patented Dec. 22, 1970

1

3,549,274
STIRRERS
Ronald Colgan Jewell, Ormskirk, England, assignor to Pilkington Brothers Limited, Liverpool, England, a corporation of Great Britain
Filed Mar. 28, 1969, Ser. No. 811,302
Claims priority, application Great Britain, Apr. 2, 1968, 15,799/68
Int. Cl. C03b 5/18
U.S. Cl. 416—224                11 Claims

ABSTRACT OF THE DISCLOSURE

A stirrer for stirring molten glass comprises a molybdenum core coated with a refractory material and sheathed with platinum or a platinum alloy, and has the gas space between the molybdenum core and the platinum or platinum alloy sheath charged with a gas which is inert with respect to molybdenum, the refractory material and platinum or the platinum alloy. The gas space is evacuated to a pressure not exceeding $10^{-3}$ torr before being charged with the inert gas.

BACKGROUND OF THE INVENTION (1) Field of the invention

The present invention relates to stirrers and more particularly to a construction of stirrer for stirring molten glass.

(2) Desciption of the prior art

The advantages gained by stirring molten glass have been appreciated for many years and in practice stirrers are passed through openings in the roof of the molten glass tank or furnace, down through the atmosphere above the molten glass and into the molten glass. The supporting and driving apparatus for the stirrers is located outside the container and is thus protected from the high temperature atmosphere therein. It is also known to use molybdenum stirrers for this purpose, the metal surfaces being protected from the corrosive atmosphere within the glass tank. Proposals have been made for protecting the molybdenum metal surfaces including coating the metal with alumina all within an outer platinum or platinum alloy sheath. This particular system is not, however, entirely satisfactory, since the presence of any molecular oxygen within the pores which are inevitably present in the alumina coating may lead both to the formation of molybdenum trioxide and to the subsequent reaction of the trioxide with the platinum or platinum alloy sheath resulting finally in the disruption of the latter.

It is an object of the present invention to provide an improved stirrer having a molybdenum core and a platinum or a platinum alloy sheath.

SUMMARY

According to the present invention a stirrer for stirring molten glass, comprising a molybdenum core coated with a refractory material and sheathed with platinum or a platinum alloy, is characterised in that the gas space between the molybdenum core and the platinum or platinum alloy sheath is charged with a gas which is inert with respect to molybdenum, the refractory material and platinum or the platinum alloy.

By charging the gas space with such an inert gas the passage of any remaining oxygen and volatile molybdenum trioxide in the porous material is not substantially reduced but the gas permits the pressure in the stirrer to approach the pressure in the tank whereby the pressure difference across the platinum or platinum alloy sheath is reduced and a breach of the platinum or platinum alloy sheath does not result in the sudden entry of large volumes of ambient atmosphere, so that a longer effective life of the stirrer is obtained.

Conveniently a suitable inert gas is argon or nitrogen and the pressure of the inert gas within the platinum sheath may be lower or equal to the pressure of the tank atmosphere above the glass to be stirred.

Preferably the oxygen content of the gas space is reduced by evacuating the interior of the sheath to a pressure which does not exceed $10^{-3}$ torr and then flooding the evacuated space with said inert gas. Accordingly, the invention also includes a method of producing a stirrer for stirring molten glass, comprising coating a molybdenum core with a refractory material, and cladding the coated core with a sheath of platinum or a platinum alloy, characterised by the steps of evacuating gas present between the molybdenum core and the platinum or platinum alloy sheath to a pressure which does not exceed $10^{-3}$ torr, and subsequently charging the evacuated space with a gas which is inert with respect to molybdenum, the refractory material and platinum or the platinum alloy. The evacuation followed by "flushing" with said inert gas can be repeated to "flush" as much oxygen-containing gas from the sheath as is possible.

The refractory material may be alumina but in fact any stable refractory material inert with respect to molybdenum and platinum (or the platinum alloy), capable of maintaining the space between the molybdenum core and the platinum and of affording support to the platinum at the operational temperatures of the stirrer may be used.

DESCRIPTION OF THE PREFERRED EMBODIMENT

Figure 2:
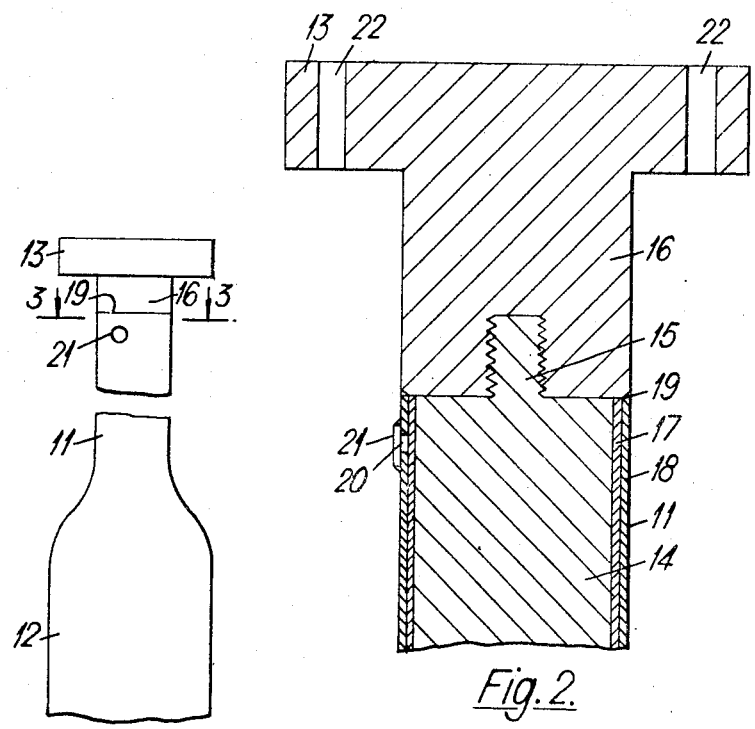
FIG. 2 is a cross-sectional elevation of the upper end of the stirrer shown in FIG. 1.
Figure 1:
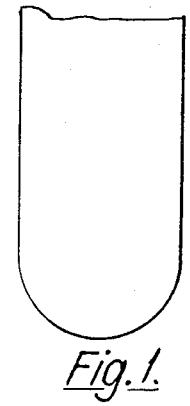
FIG. 1 is by way of example, a side view of a glass stirrer, according to the invention.
Figure 3:
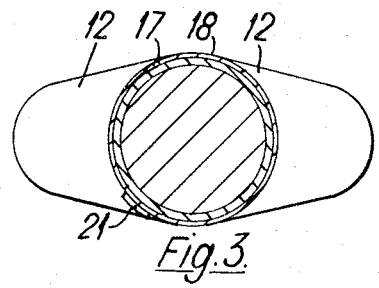
FIG. 3 is a section along the line 3—3 in FIG. 1.

With reference to the drawings, a stirrer has an upper cylindrical section 11, a lower section 12, having an elongated elliptical cross section, and a flange 13 at the upper end of the cylindrical section 11 by which the stirrer is connected to a drive arrangement (not shown).

The stirrer comprises a molybdenum core 14 having a threaded axial extension 15 at its upper end, screwed into a cylindrical heat resistant steel section 16 on which the flange 13 is formed.

The molybdenum core 14 is sprayed with alumina to build up a coating 17 some 0.010 inch thick over the whole of the exposed surface of the molybdenum core 14 and the alumina coated molybdenum core is clad with pltainum or a platinum alloy to form a sheath 18 completely isolating the alumina coated molybdenum core 14 from atmosphere apart from the hole 20 described below. The sheath 18 is soldered to the steel section 16 with silver solder, generally indicated by reference numeral 19, to ensure that the upper end of the interior of the sheath 18 is sealed from atmosphere.

Evacuation of the gas space between the molybdenum core and the sheath 18 of the stirrer is carried out through a small hole 20 in the shetah 18 by connecting the interior of the sheath 18 to a low pressure source and maintaining evacuation until the interior of the sheath 18 is at a pressure of $10^{-3}$ torr or less. This step of evacuating the gas space in the stirrer is performed to remove as much as possible of the oxygen containing gas therein. The interior of the sheath 18 is then flooded with argon until the pressure within the sheath 18 reaches 2 torr.

The hole 20 is then sealed by a platinum or platinum alloy plate 21 which is welded to the sheath 18 to form an air-tight closure for the hole 20.

Once the plate 21 has been welded in position, the interior of the sheath 18 is completely sealed from atmosphere, and the stirrer can be brought to its operational temperature and introduced into its working position. Holes 22 in flange 13 permit the stirrer to be bolted to the supporting and driving arrangement.

In operation, the pressure within the gas space in the stirrer, i.e., the space filled with argon, can be equal to that of the atmosphere surrounding the stirrer so that a breach of the sheath 18 is not necessarily followed by rapid entry of tank atmosphere into the gas space. Tank atmosphere can only enter the gas space to compensate for loss of argon from the said space, and thus a breach of the sheath will not necessarily result in the very rapid deterioration which is experienced with a stirrer of which the gas space has not been first evacuated and then filled with argon.

The invention is not limited to the specific details of the stirrer described above. For example, in an alternative method of preparing the stirrer, two holes may be formed in the sheath 18 and an inert gas under pressure pumped through one hole to force air out of the other hole and finally, when the gas space has been charged with argon, both holes may be sealed by plates 21.

Furthermore, instead of the gas space in the stirrer being filled with argon, the gas space may be filled with any gas that is inert with respect to the molybdenum, the refractory material and the platinum or platinum alloy. Another suitable gas is nitrogen.

Also, instead of the molybdenum core being coated with alumina, the molybdenum core could be coated with any refractory material having the above-mentioned properties therefor.

I claim:

1. A stirrer for stirring molten glass, comprising a molybdenum core coated with a refractory material and sheathed with platinum or a platinum alloy, characterised in that the gas space between the molybdenum core and the platinum or platinum alloy sheath is charged with a gas which is inert with respect to molybdenum, the refractory material and platinum or the platinum alloy.

2. A stirrer according to claim 1, wherein the refractory material is alumina.

3. A stirrer according to claim 1, wherein said inert gas is argon or nitrogen.

4. A stirrer according to claim 1, wherein the pressure of said inert gas in said gas space does not exceed the pressure of the tank atmosphere above the glass to be stirred.

5. A stirrer according to claim 1, wherein the pressure of said inert gas in said gas space is 2 torr.

6. A stirrer according to claim 1, wherein said gas space is evacuated to a pressure which does not exceed $10^{-3}$ torr and the evacuated space is subsequently charged with said inert gas.

7. A method of producing a stirrer for stirring molten glass, comprising coating a molybdenum core with a refractory material, and cladding the coated core with a sheath of platinum or a platinum alloy, characterised by the steps of evacuating gas present between the molybdenum core and the platinum or platinum alloy sheath to a pressure which does not exceed $10^{-3}$ torr, and subsequently charging the evacuated space with a gas which is inert with respect to molybdenum, the refractory material and platinum or the platinum alloy.

8. A method according to claim 7, wherein the steps of evacuating the gas and then charging the evacuated space with said inert gas are repeated at least once.

9. A method according to claim 7, wherein the evacuated space is charged with argon or nitrogen.

10. A method according to claim 7, wherein the evacuated space is finally charged with said inert gas to a pressure which does not exceed the pressure of the tank atmosphere above the glass to be stirred.

11. A method according to claim 7, wherein the evacuated space is finally charged with said inert gas to a pressure of 2 torr.

References Cited

UNITED STATES PATENTS 2,811,339  10/1957  Osborne et al. _____ 416—241X
3,326,534   6/1967  Pryde _____ 416—241X EVERETTE A. POWELL, JR., Primary Examiner U.S. Cl. X.R.

416—241